United States Patent Office 3,075,500
Patented Jan. 29, 1963

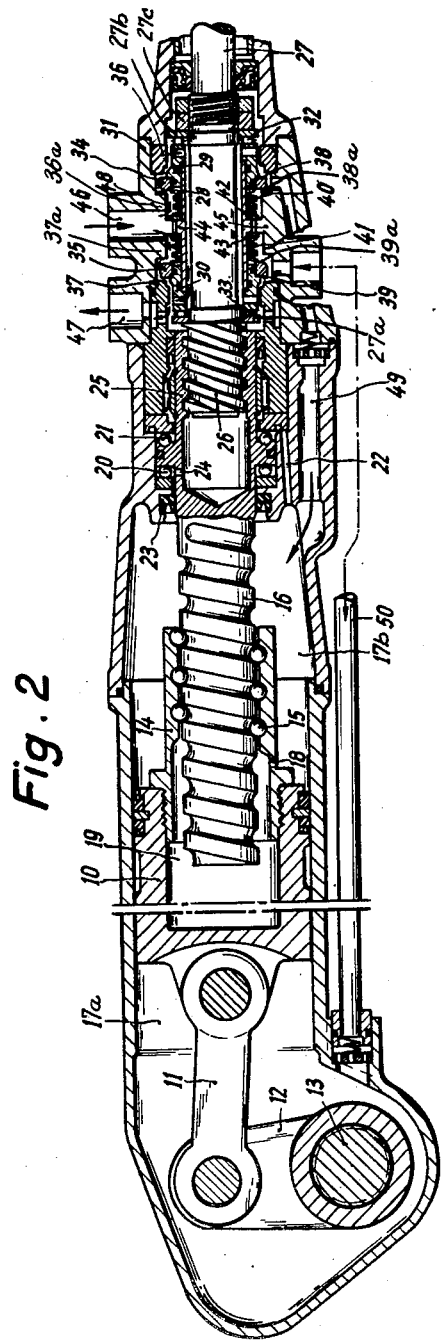

3,075,500
STEERING GEAR FOR MOTOR VEHICLES
Erwin Mazur, Edingen, near Mannheim, and Hermann Reiter, Ludwigshafen (Rhine), Germany, assignors to Fulminawerk K.G. Franz Muller, Mannheim-Friedrichsfeld, Germany
Filed Apr. 20, 1959, Ser. No. 807,422
Claims priority, application Germany Apr. 22, 1958
10 Claims. (Cl. 121—41)

This invention relates to a power-assisted steering gear for motor vehicles.

The invention is applied to a steering gear having a hydraulic servomotor effective only when a given steering torque is exceeded and controlled by ring valves located around the steering shaft and axially springloaded against stops.

The object of the invention is to simplify the entire structure of the steering gear and to improve the mode of operation of the steering valves for the servomotor. A further object of the invention consists in simplifying the structure of the steering gear's hydraulic part, particularly of the steering valve. According to a further object of the invention the mode of operation is to be improved so that the requested force of reaction occurs during steering, independent of the fact whether one steers to the right or to the left.

An essential feature of the invention consists in that the annular pistons forming the springy supported valve bodies are guided on the inside only and that they are supported axially slidable on a control sleeve connected with the steering tube. This construction reduces the fitting work during manufacturing.

According to a further feature of the invention guide sleeves attached to the control sleeve may be assigned to the annular pistons, said guide sleeves forming stationary valve bodies. The forces of reaction becoming effective on operating the servo steering may be better adjusted by this measure.

According to another feature of the invention the reaction surfaces of the valve bodies operating in direction to spindle and steering tube differ from each other because of the admission of pressure to the spindle end plane in such a way that the forces of reaction operative to the steering tube are equal-sized when steering to the right or to the left. The invention aims, too, to the particular relative sizes between the operative surfaces of the valve bodies referring to the cross section of the spindle projecting into the servomotor's piston cylinder.

According to the invention, the ring valves are guided only by their inner peripheries and are axially slidable relatively to a control sleeve mounted on the steering shaft.

Other features of the invention will be described with reference to the accompanying drawing which shows, by way of example, two embodiments of the invention, and in which:

FIGURE 1 is a general diagram of a steering gear according to the invention,

FIGURE 2 is a longitudinal section through a first embodiment of the steering gear, and FIGURE 3 shows a longitudinal section through a part of the gear graphed along the lines of FIGURE 2 but in another embodiment of the invention.

FIGURE 1 shows a steering column of a motor vehicle consisting essentially of the steering wheel 1, the column 2 surrounding the steering tube, and the casing 3 containing the steering gear and the steering valve. Pressure oil contained in a reservoir 4 is supplied by a continously running pump 5 and a duct 6 to the steering valve. Across a duct 7 the pressure oil flows back to the reservoir 4. The steering gear acts upon a steering lever 8 which is connected by means of a rod 9 with the wheels of the vehicle to be directed.

FIG. 2 shows the interior of the casing 3 of which one part forms a cylinder for a trunk piston 10. The piston is connected by means of a link 11 with a lever 12 fast on a rock shaft 13 journalled in the casing 3 and carrying, outside the casing, the drop arm 8.

An extension sleeve 14 is screwed into the trunk piston 10 and is internally helically grooved to engage, through balls 15, as a nut on a worm 16. The piston 10 divides the cylinder into two pressure chambers 17$^a$ and 17$^b$. The pressure chamber 17$^b$ is connected by a radial port 18 in the sleeve nut 14 with the cavity 19 of the piston 10 so that both effective surfaces of the piston are of substantially equal area.

The worm 16 is supported in the casing 3 by means of two axial-thrust ball bearings 20 and 21. The bearing space of the ball bearing 21 is connected by a duct 22 with the pressure chamber 17$^b$ so as to balance the effect on the worm 16 of hydraulic pressure in the chamber 17$^b$. A sealing ring 23 is provided around the stem of the worm 16 in the casing 3, but any oil penetrating past the ring 23 into the space of the bearing 20 can escape through a port 24 so as to avoid any build-up of pressure.

The end 26 of the steering tube 27 equipped with suitable thread engages in the hollow end 25 of the spindle 16 provided with an internal thread. This coarse thread and the thread of spindle 16 are in the same direction. The pitch of the coarse thread is at least 1.5 times as great as that of the spindle thread.

The description of the steering valve is as follows: The lower end of the steering shaft 27 is surrounded by a control sleeve 28, on the ends of which is fitted guide sleeves 29 and 30 located in a valve casing 31 by means (not shown) so that the sleeve 28 surrounds the steering shaft 27 with constant clearance. The end surfaces of the guide sleeves 29 and 30 bear axially against needle bearings 32 and 33 which, in turn, bear against rings 27$^a$ and 27$^b$ retained on the steering shaft 27 by the screw-thread at 26 and adjusting nuts 27$^c$, respectively.

A ring valve 34 is carried by its inner periphery on the guide sleeve 29 and another ring valve 35 is similarly carried on the guide sleeve 30, there being a clearance for oil to flow past the outer peripheries of these ring valves. Stop rings 36 and 37 and opposed annular shoulders 36$^a$ and 37$^a$ in the valve casing 31 are associated with the ring valves 34 and 35, respectively, to form control gaps 38, 38$^a$ and 39, 39$^a$. The ring valves 34 and 35 are spring-loaded axially by sets of dished spring washers 40 and 41 retained by rings 42 and 43 which abut jointly against an external flange 44 on the control sleeve 28 and an internal flange 45 of the valve casing 31.

The oil pressure line is connected to an inlet 46, the oil return line to an outlet 47. The inlet 46 leads to a ring chamber 48 which may be closed at either end by the ring valves 34 and 35 according to the working direction. The ring chamber 48 is connected at one end by a duct 49 with the pressure chamber 17$^b$ and at the other end by a duct 50 with the pressure chamber 17$^a$.

The mode of operation of the embodiment of FIGURE 2 is as follows: In the position shown by FIGURE 2 the steering valves 34 and 35 are in central position. In this case the pressure oil streaming in through the inlet 46 flows in the direction of the arrows shown in the drawing to the return connection piece 47 without having exerted any effective pressure on the piston 10. When the steering shaft 27 is turned, steering can be effected simply mechanically through the worm 16 and sleeve nut 14 unless the torque required to overcome the resistance of the vehicle wheels to steering is greater than the coarse thread of the parts 25 and 26 will transmit without relative turning.

Any relative turning of the parts 25 and 26 results in an axial movement of the steering shaft 27 and therewith of the control sleeve 28, guide sleeves 29 and 30, and ring valves 34 and 35.

For a right-hand turn, such axial movement will be to the right as seen in FIG. 2 and, when the ring valves 34 and 35 respectively close the gaps 38 and 39a, oil supplied under pressure through the inlet 46 to the annular space 48 is directed through the duct 49 to the pressure chamber 17b and thrusts the piston 10 to the left to assist the steering torque applied to the shaft 27. The pressure chamber 17a is open to exhaust oil through the duct 50 and gap 39 to the outlet 47.

For a left-hand turn, the operation is reversed, the ring valves 34 and 35 closing the gaps 38a and 39 to admit oil under pressure to the chamber 17a through the gap 39a and duct 50.

By design of the various parts so that, in the central position, the axial dimension of the gap 38 is greater than that of the gap 39a and that of the gap 39 is greater than that of the gap 38a, a progressive power assistance is obtained due to the fact that the first effect of axial movement of the valve assembly is to reduce free escape of oil from the annular space 48, by the respective ring valve closing against the stop ring 36 or 37, and thereafter the spring washers 40 or 41 of the leading ring valve are compressed until the other ring valve closes against the respective shoulder 37a or 36a to close the annular space 48 except for passage of oil therefrom through the respective duct 49 or 50.

An alternative embodiment of the invention is shown by FIG. 3 and in this case a worm 51 is formed integrally on a steering shaft 52.

The valve mechanism also is modified so that a ring valve 53, nearer the worm 51, is mounted on a guide sleeve 54, as in the FIG. 2 construction, but the other ring valve 55 is mounted directly on the control sleeve 56.

The worm end of the steering shaft 52 within the cavity 57 of the piston is exposed to the pressure of oil from the valve casing through a duct 62, pressure chamber 63, and port 64.

Regarding the ring valve 53 and guide sleeve 54 as a valve unit, it is necessary for the effective surface of this unit and of the ring valve 55 to be balanced in relation to the effective surface of the steering shaft end in the cavity 57 in order for hydraulic reaction on the steering shaft to be equal for both directions of steering. For this purpose, the effective surface of the unit 53, 54 is greater than that of the steering shaft end.

Designating the effective surface of the spindle-side valve body as $F_1$, the effective surface of the annular piston 53 as $F_h$, and the effective surface of the guide sleeve 54 as $F_b$, the following equation is valid:

$$F_1 = F_h + F_b$$

Furthermore the effective surface of the ring valve 55 may be designated as $F_r$ and the surface of the steering shaft subjected to pressure as $F_s$.

In order to obtain under this assumption the effect requested by this invention the surfaces must fit the following relation:

$$F_r = F_h + 2F_b - F_s$$

We claim:

1. In a steering gear for motor vehicles, a liquid tight casing, a steering shaft extending into said casing at one end thereof, a crank arm on said steering shaft within said casing, said casing including a cylindrical portion extending from said one end, a piston slidably mounted in said cylindrical portion, a connecting rod connecting said piston with said crank arm whereby motion of said piston will operate on said crank arm to rotate said steering shaft, screw threaded nut means mounted on the side of said piston remote from said connecting rod, an annular valve chamber formed in said casing beyond and coaxial with said cylindrical portion, screw threaded means rotatably mounted in said casing extending coaxially through said valve chamber cooperatively engaging said nut means, steering means to rotate said screw threaded means to selectively bias said piston according to the direction of rotation of said steering means, a supply connection to said valve chamber for provision of hydraulic fluid under pressure to said valve chamber, two pairs of spaced annular valve seats coaxial with said steering means, one at each axial end of said valve chamber, a connecting passage means from the space between one said pair of annular valve seats to said cylindrical portion of said casing on one side of said piston, a connecting passage means from the space between the other said pair of annular valve seats to said cylindrical portion of said casing on the other side of said piston, discharge passage means outwardly of each of said pair of annular valve seats, and two annular valve elements positioned on said steering means one between each of said pairs of valve seats spaced at a fixed axial distance such that upon axial movement of said steering means under the influence of said screw threaded means rotating in said screw threaded nut means each of said valve elements seats on a valve seat one to close off the space between its two valve seats from the hydraulic fluid supply connection and the other to close off the space between its two valve seats from its discharge passage means.

2. The steering gear of claim 1, in which the portion of said casing including said valve chamber is formed to be separable from the portion of said casing including said cylindrical portion to provide for easy replacement of valve parts.

3. A steering gear for motor vehicles including a rotatable steering column, a steering shaft having a crank arm thereon, screw threads on said steering column, steering nut means cooperating with said threads and mounted on said crank arm whereby rotation of said steering column will rotate said steering shaft, servomotor means including a piston operating in an enclosed cylinder mounted to operate to aid said threads and nut means to rotate said steering shaft, a source of hydraulic fluid under pressure, valve means formed annularly around said steering column, said valve means including a casing surrounding said steering column and including two axially spaced valve elements mounted for normal axial movement with said steering column, said casing between said two valve elements being formed as at least one annular fluid passage connected to said source of fluid under pressure and having central abutment means extending toward said steering column, annular portions of larger diameter than said annular passage at each end of said annular passage, the walls of said annular portions adjacent said annular passage forming, with the wall of said annular passage, oppositely facing inlet valve sets, oppositely facing shoulders in said casing spaced axially from said inlet valve seats to form outlet valve seats, outlet passage means leading from said outlet valve seats to return hydraulic fluid to said source, each said valve element normally lying approximately midway between an annular inlet and an annular outlet valve seat, first duct means connecting said annular portions of larger diameter to one end of said enclosed cylinder, second duct means connecting the other said annular portion of larger diameter to the other end of said enclosed cylinder, and spring means operatively engaging said valve elements and said abutment means normally holding said steering column against axial movement, whereby upon rotation of said steering column the steering column may move axially against the force of said spring means to seat one said valve element against an inlet valve seat and the other said valve element against an outlet valve seat as resistance to turning the column is developed, to move said valve elements axially whereby the hydraulic fluid under pressure is deflected to the servomotor means to bias the piston in a direction to assist in rotating said steering shaft.

4. The steering gear according to claim 3, in which said steering column comprises two coaxial portions connected together by a coarse screw thread of greater pitch than the thread of said steering nut means.

5. The steering gear of claim 4, in which said two coaxial portions of said steering column comprise a steering tube carrying said valve elements, and a steering spindle carrying said screw threads cooperating with said steering nut, and in which said steering spindle is restricted from axial movement.

6. The steering gear of claim 5, in which said coarse screw threads are of the same band as the threads of said steering nut.

7. The steering gear according to claim 3, in which the valve means are proportioned so that equal effect is given to the servo-motor means when steering in either direction.

8. The steering gear according to claim 3, in which the valve means are proportioned to compensate for the loss of effective area of the steering column entering the enclosed cylinder.

9. The steering gear of claim 3, in which said fluid return passages are connected together by an axial passage radially inwardly of said valve elements.

10. In a steering gear for motor vehicles, a liquid tight casing, a steering shaft extending into said casing at one end thereof, a crank arm on said steering shaft within said casing, said casing including a cylindrical portion extending from said one end, a piston slidably mounted in said cylindrical portion, a connecting rod connecting said piston with said crank arm whereby motion of said piston will operate on said crank arm to rotate said steering shaft, screw threaded nut means mounted on the side of said piston remote from said connecting rod, an annular valve chamber formed in said casing beyond and coaxial with said cylindrical portion, screw threaded means rotatably mounted in said casing cooperatively engaging said nut means, steering means coupled to said screw threaded means by screw threads of greater pitch than said screw thread means to rotate said screw threaded means to selectively bias said piston according to the direction of rotation of said steering means, a supply connection to said valve chamber for provision of hydraulic fluid under pressure to said valve chamber, two pairs of spaced annular valve seats coaxial with said steering means, one at each axial end of said valve chamber, a connecting passage means from the space between one said pair of annular valve seats to said cylindrical portion of said casing on one side of said piston, a connecting passage means from the space between the other said pair of annular valve seats to said cylindrical portion of said casing on the other side of said piston, discharge passage means outwardly of each of said pair of annular valve seats, and two annular valve elements positioned on said steering means one between each of said pairs of valve seats spaced at a fixed axial distance such that upon axial movement of said steering means under the influence of said screw threaded means rotating in said screw threaded nut means each of said valve elements seats on a valve seat, one to close off the space between its two valve seats from the hydraulic fluid supply connection and the other to close off the space between its two valve seats from its discharge passage means.

References Cited in the file of this patent

UNITED STATES PATENTS

| | | |
|---|---|---|
| 1,392,646 | Jones | Oct. 4, 1921 |
| 1,937,470 | Davis | Nov. 28, 1933 |
| 2,587,495 | MacDuff | Feb. 26, 1952 |
| 2,605,854 | MacDuff | Aug. 5, 1952 |
| 2,681,045 | Klessig et al. | June 15, 1954 |
| 2,824,314 | Davis | Feb. 25, 1958 |
| 2,885,904 | Roberts | May 12, 1959 |
| 2,924,202 | Mazur et al. | Feb. 9, 1960 |

FOREIGN PATENTS

| | | |
|---|---|---|
| 198,627 | Austria | July 10, 1958 |